(12) United States Patent
Ishizaki et al.

(10) Patent No.: US 8,913,292 B2
(45) Date of Patent: Dec. 16, 2014

(54) IMAGE READING APPARATUS AND METHOD, AND IMAGE FORMING APPARATUS

(71) Applicant: Fuji Xerox Co., Ltd., Tokyo (JP)

(72) Inventors: Sunao Ishizaki, Kanagawa (JP); Yoshifumi Takebe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 24 days.

(21) Appl. No.: 13/758,345

(22) Filed: Feb. 4, 2013

(65) Prior Publication Data

US 2014/0022571 A1 Jan. 23, 2014

(30) Foreign Application Priority Data

Jul. 23, 2012 (JP) ................. 2012-162846

(51) Int. Cl.
*H04N 1/60* (2006.01)
*G06K 1/00* (2006.01)

(52) U.S. Cl.
CPC .................... *H04N 1/6044* (2013.01)
USPC ............ 358/1.9; 358/518; 358/509; 358/474; 358/461; 358/498; 382/162

(58) Field of Classification Search
USPC ............................ 358/1.9, 518, 509; 382/162
See application file for complete search history.

(56) References Cited

U.S. PATENT DOCUMENTS

2011/0299104 A1* 12/2011 Seo et al. ............... 358/1.9
2013/0278979 A1* 10/2013 Mikami ................. 358/509

FOREIGN PATENT DOCUMENTS

| AU | 2011203034 A1 | 5/2012 |
|---|---|---|
| JP | 2663853 A | 10/1997 |
| JP | 3545844 A | 7/2004 |
| JP | 3870057 A | 1/2007 |
| JP | 2012-094939 A | 5/2012 |

* cited by examiner

*Primary Examiner* — Quang N Vo
(74) *Attorney, Agent, or Firm* — Sughrue Mion, PLLC

(57) ABSTRACT

An image reading apparatus includes an image reading unit and a computational unit. The image reading unit includes a reference reflecting member that acts as a color reference, an illuminating unit that illuminates a part of the reference reflecting member and a sheet being transported in proximity thereto, a line sensor that reads an image formed on the sheet and the part of the reference reflecting member in proximity to the sheet in the sheet width direction, and a spectroscope that measures the spectral distribution of each of multiple patches for correcting color tones formed on the sheet and arranged in the sheet transport direction. The computational unit generates color tone correction data by performing computations based on the spectral distribution of each patch measured by the spectroscope, and the read values of the reference reflecting member obtained by the line sensor.

3 Claims, 17 Drawing Sheets

IMAGE READING APPARATUS AND METHOD, AND IMAGE FORMING APPARATUS

CROSS-REFERENCE TO RELATED APPLICATIONS

This application is based on and claims priority under 35 USC 119 from Japanese Patent Application No. 2012-162846 filed Jul. 23, 2012.

BACKGROUND

Technical Field

The present invention relates to an image reading apparatus and method, and to an image forming apparatus.

SUMMARY

According to an aspect of the invention, there is provided an image reading apparatus including an image reading unit and a computational unit. The image reading unit reads, from a sheet being transported, an image printed onto the sheet, and includes a reference reflecting member that acts as a color reference, having at least a part thereof disposed at a location in proximity to the sheet being transported in the sheet width direction that intersects the sheet transport direction, an illuminating unit that illuminates the reference reflecting member and the sheet passing through, a line sensor that reads, from the sheet being transported, an image formed on the sheet, and in addition, reads the part of the reference reflecting member in proximity to the sheet in the sheet width direction, and a spectroscope which has a visual field encompassing multiple patches for correcting color tones formed on the sheet and arranged in the sheet transport direction, and which measures the spectral distribution of each patch. The computational unit generates color tone correction data for correcting color tones by performing computations based on the spectral distribution of each patch measured by the spectroscope, and the read values of the reference reflecting member obtained by the line sensor.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described.

Figure 1:
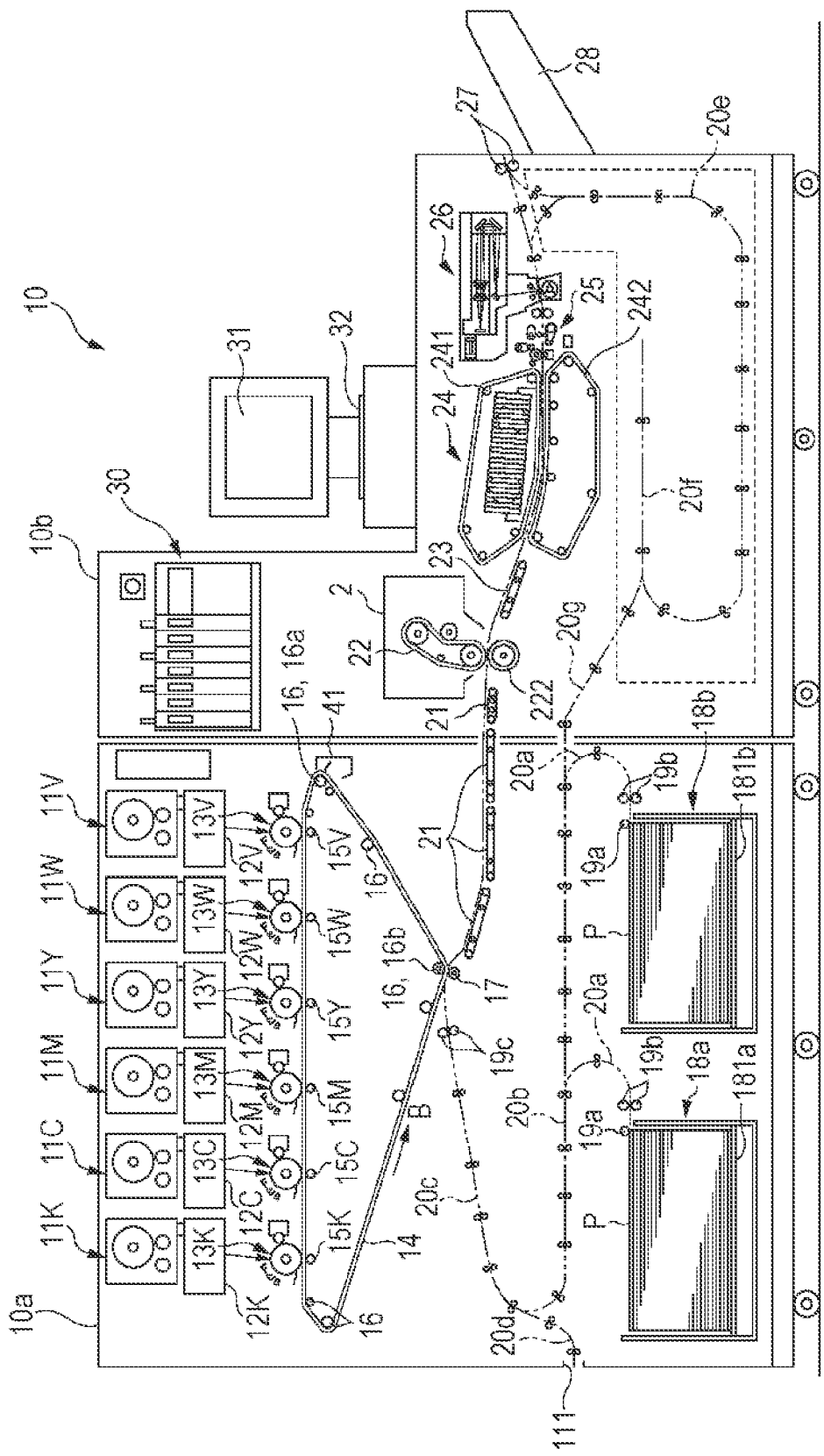
FIG. 1 is a schematic configuration diagram of an image forming apparatus according to an exemplary embodiment.

FIG. 1 is a schematic configuration diagram of an image forming apparatus according to an exemplary embodiment.

The image forming apparatus 10 includes a first housing 10a and a second housing 10b which are coupled to each other. The respective members constituting the image forming apparatus 10 are built in separated into these two housings.

The image forming apparatus 10 includes a configuration that forms an image using a maximum of six colors (including a transparent color) of toner. Six toner cartridges 11V, 11W, 11Y, 11M, 11C, and 11K which contain toner of respective colors are arranged in the upper part of the first housing 10a.

Herein, the letter V in the above reference sign represents a first special color (the transparent color, for example), while W is for a second special color (light magenta, for example), Y is for yellow, M is for magenta, C is for cyan, and K is for black. Hereinafter, these letters representing colors will be omitted from the reference signs indicating the toner cartridges when the colors are not being distinguished, and the toner cartridges will be simply designated the toner cartridges 11. When the colors are being distinguished, the toner cartridges will be expressed with the above letters representing the colors added after the numerals. This applies similarly to elements other than the toner cartridges 11.

Toner in each toner cartridge 11 is supplied to image forming units 13 described hereinafter. Each toner cartridge 11 is replaceable, and upon becoming empty, is replaced with a new toner cartridge 11 containing toner of the same color.

Six exposure units 12 and six image forming units 13, which respectively correspond to the above six toner cartridges 11, are provided below the toner cartridges 11 in the first housing 10a.

Figure 2:
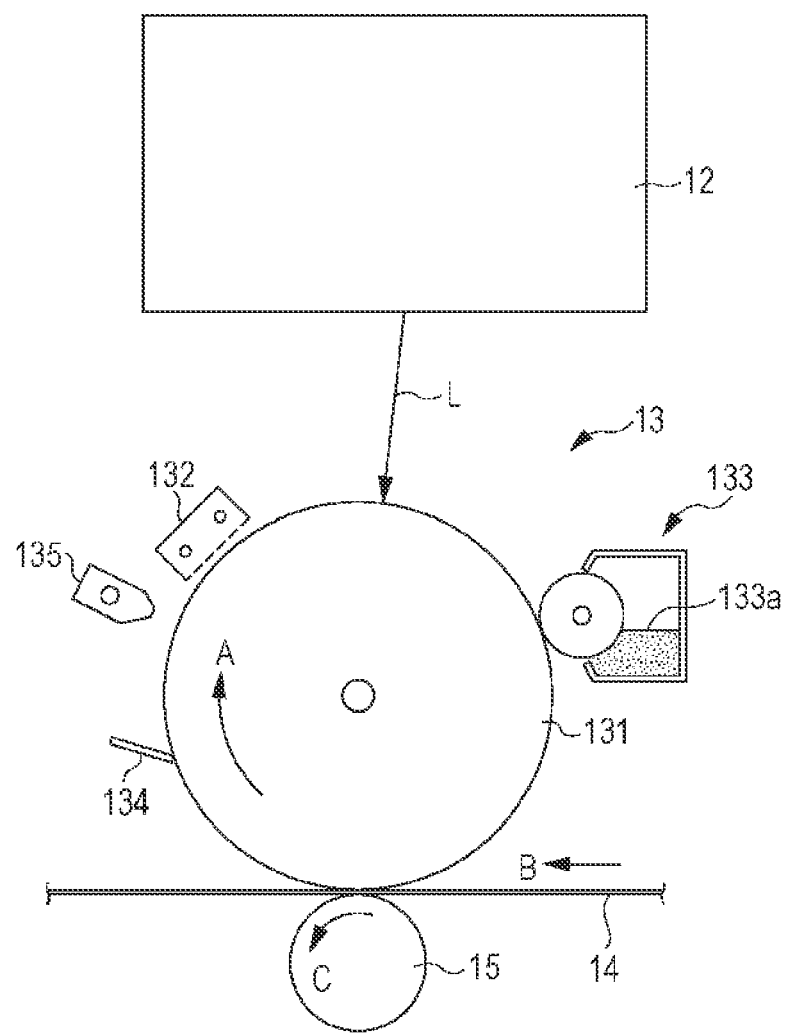
FIG. 2 is a schematic diagram illustrating the configuration in the vicinity of a single image forming unit.

FIG. 2 is a schematic diagram illustrating the configuration in the vicinity of a single image forming unit.

The image forming unit 13 is equipped with a drum-shaped photoreceptor 131 that rotates in the direction of the arrow A. Around the photoreceptor 131 are disposed a charger 132, a developing unit 133, a cleaning blade 134, and a discharger 135. Also, the above-mentioned exposure unit 12 is disposed above the photoreceptor 131, and in addition, a first transfer roller 15 is disposed at a position that sandwiches an intermediate transfer belt 14 discussed later between itself and the photoreceptor 131.

The photoreceptor 131 receives charge from the charger 132 while rotating in the direction of the arrow A, and is exposed by an exposure beam L from the exposure unit 12. The exposure unit 12 repeatedly scans over the photoreceptor 131 in a direction perpendicular to the plane of the page in FIG. 2 with an exposure beam L that is modulated according to image data, and forms an electrostatic latent image by repeatedly scanning the exposure beam L over the photoreceptor 131. The electrostatic latent image is developed by the developing unit 133, which contains developer including toner and a carrier, with the toner in the developer, and a toner image is formed on the photoreceptor 131. Toner is supplied from a corresponding toner cartridge 11 (see FIG. 1) such that a predetermined amount of toner is contained in the developing unit 133. The toner image formed on the photoreceptor 131 by the action of the developing unit 133 is transferred onto the intermediate transfer belt 14, which moves in the direction of the arrow B, by the action of the first transfer roller 15 rotating in the direction of the arrow C.

Toner remaining on the photoreceptor 131 after transfer is scraped off the photoreceptor 131 and collected by the cleaning blade 134. Additionally, the photoreceptor 131 is discharged by the discharger 135 to remove the remaining latent image thereon, and newly charged by the charger 132.

The description will now return to FIG. 1 and proceed.

An endless intermediate transfer belt 14 is provided below the six image forming units 13. The intermediate transfer belt 14 is supported by multiple rollers 16, including a driving roller 16a and a backup roller 16b, and circulates in the direction of the arrow B while contacting the respective photoreceptors 131 constituting the image forming units 13.

A second transfer roller 17 is provided at a position opposite the backup roller 16b with the intermediate transfer belt 14 in between. A toner image transferred onto the intermediate transfer belt 14 in successive layers by the action of the first transfer rollers 15 disposed with respect to each of the image forming units 13 is additionally conveyed in the direction of the arrow B by the intermediate transfer belt 14. This toner image on the intermediate transfer belt 14 is then transferred a second time onto a sheet conveyed by the action of the second transfer roller 17 to a position sandwiched between the intermediate transfer belt 14 and the second transfer roller 17. In so doing, an unfused toner image is formed on the sheet.

Two sheet containers 18a and 18b are provided in the lower part of the first housing 10a. The sheet containers 18a and 18b each contain many sheets of paper P in a stacked state. A sheet of paper P is retrieved from the sheet containers 18a and 18b when forming an image, with the sheet containers 18a and 18b being constructed such that their floor plates 181a and 181b rise as the number of sheets contained in the sheet containers 18a and 18b decreases.

When forming an image, the uppermost sheet of paper P is retrieved by a pickup roller 19a from among the sheets of paper P contained in one of the sheet containers 18a and 18b specified manually by the operator or specified automatically. When multiple sheets are picked up at once, a single sheet is reliably separated out by a separation roller 19b, and that single sheet is conveyed on transport paths 20a, 20b, and 20c by transport rollers 19 until the leading edge of the sheet of paper P thus conveyed reaches a registration roller 19c. An inlet 111 that lets in sheets from outside the first housing 10a is also provided on the first housing 10a, and when a sheet is let in from this inlet 111, the sheet thus let in is conveyed on transport paths 20d and 20c until its leading edge reaches the registration roller 19c. The registration roller 19c corrects the orientation of a conveyed sheet, while also assuming the role of adjusting subsequent feed timings and further feeding that sheet downstream in the transport direction.

The registration roller 19c feeds a sheet such that the sheet is conveyed to the position of the second transfer roller 17 while matching the timing at which a toner image on the intermediate transfer belt 14 is conveyed to the position of the second transfer roller 17.

A sheet which has received the transfer of a toner image by the action of the second transfer roller 17 is then conveyed by a transport belt 21, enters the second housing 10b, and reaches a fuser 22. The fuser 22 includes a heating belt 221 and a pressure roller 222. A sheet conveyed to the fuser 22 is held between the heating belt 221 and the pressure roller 222 and subjected to heat and pressure, and the toner image on the sheet is fused to that sheet. A sheet passing out of the fuser 22 is cooled by a cooler 24. The cooler 24 is a type of cooler that cools a sheet held between two endless belts 241 and 242. The curl of a sheet exiting the cooler 24 is corrected by a decurler 25, and the image realized by the fused toner image on the sheet is measured by an optical measuring instrument 26. The optical measuring instrument 26 monitors whether an image is formed correctly on a sheet during typical image formation, for example. The optical measuring instrument 26 also assumes the role of taking measurements for various adjustments. For example, when making adjustments in the image forming apparatus 10, various charts such as various color patches, for example, may be arranged on a sheet, and the optical measuring instrument 26 may take colorimetric measurements of these color patches to conduct tone correction. Alternatively, an image for adjusting the image formation position or image magnification may be formed on a sheet, and the optical measuring instrument 26 may measure the image to adjust the image formation position or image magnification. Additionally, an image of uniform color and uniform density may be formed on a sheet with the image forming apparatus 10, and the optical measuring instrument 26 may be used to measure the image and confirm that no blemishes or uneven shading occurs in the image.

A sheet passing out of the optical measuring instrument 26 is delivered into a delivery receptacle 28 by a delivery roller 27.

Meanwhile, the intermediate transfer belt 14 still moves in the direction of the arrow B after the second transfer of the toner image onto a sheet by the action of the second transfer roller 17, and reaches a cleaner 41. Toner remaining on the intermediate transfer belt 14 is removed from the intermediate transfer belt 14 by the cleaner 41.

The above is a process when forming an image on only one side of a sheet. When forming an image on both sides of a sheet, the following process occurs. In this case, an image is formed on a first side of a sheet according to the same process as above, and then the sheet passes out of the optical measuring instrument 26. The sheet passing out of the optical measuring instrument 26 enters a transport path 20e before reaching the delivery roller 27, is conveyed on the transport path 20e, and additionally enters a transport path 20f. Upon entering the transport path 20f, the rotational direction of transport rollers constituting the transport path 20f is reversed, and the sheet is fed back into the first housing 10a from the transport path 20f and facing the opposite direction. The sheet is conveyed on the transport paths 20b and 20c, and reaches the registration roller 19c. The sheet at this point is oriented such that its second side, on which an image is not yet formed, faces the intermediate transfer belt 14. While the sheet is reaching the registration roller 19c along such transport paths, a toner image of an image to form on the second side of the sheet is formed with the image forming units 13 and transferred onto the intermediate transfer belt 14. Subsequently, and similarly to forming an image on the first side of the sheet, the sheet is fed from the registration roller 19c, the toner image is transferred onto the second side of the sheet by the action of the second transfer roller 17. The sheet additionally passes through the fuser 22, the cooler 24, the decurler 25, and the optical measuring instrument 26, and this time is delivered into the delivery receptacle 28 by the delivery roller 27.

In addition, on the upper part of the second housing 10b of the image forming apparatus 10, there is provided an image processor 30 which includes components such as memory that stores externally sent image data, and a computational circuit that processes such image data. Image data expressing various test chart images to be formed with the image forming apparatus 10 in order to correct color tone and image misregistration is also stored in the image processor 30.

Furthermore, a monitor 31 for displaying various states of the image forming apparatus 10 and an operation panel 32 that receives operations by an operator are disposed resting on top of a lower stepped portion of the second housing 10b.

Figure 3:
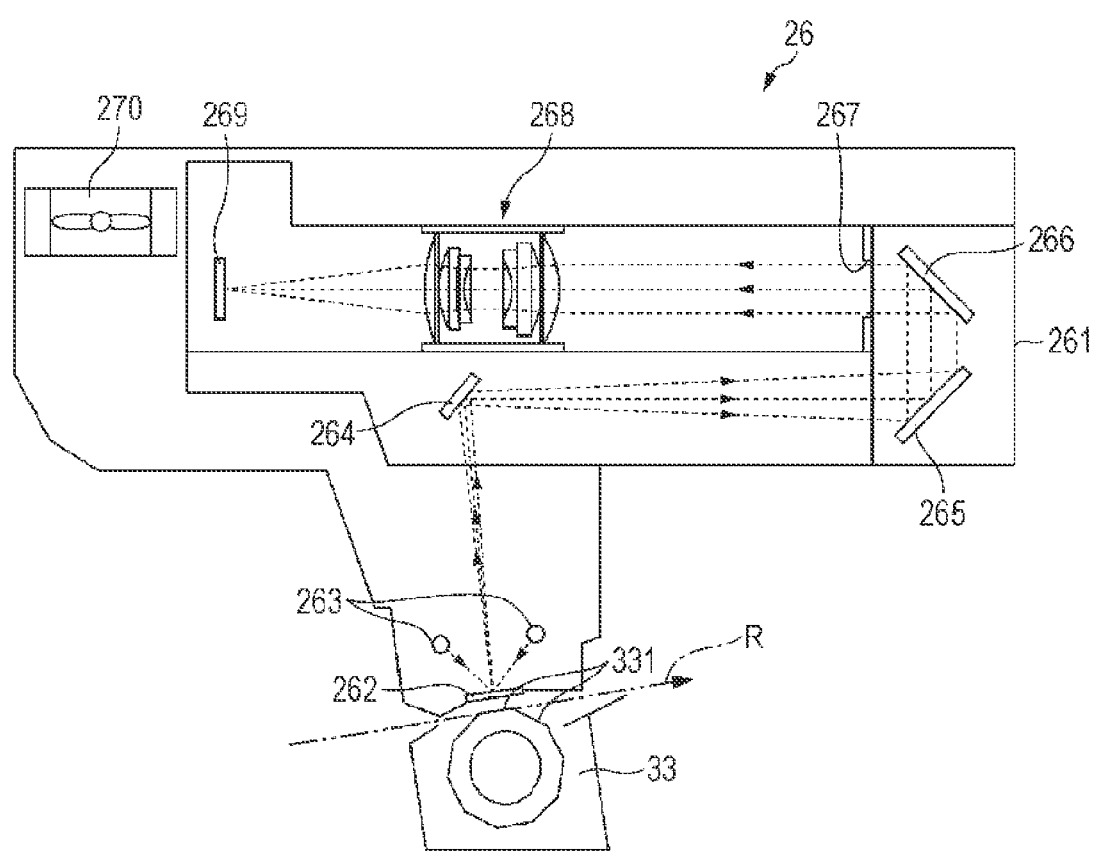
FIG. 3 is a cross-section view of an optical measuring instrument.
Figure 4:
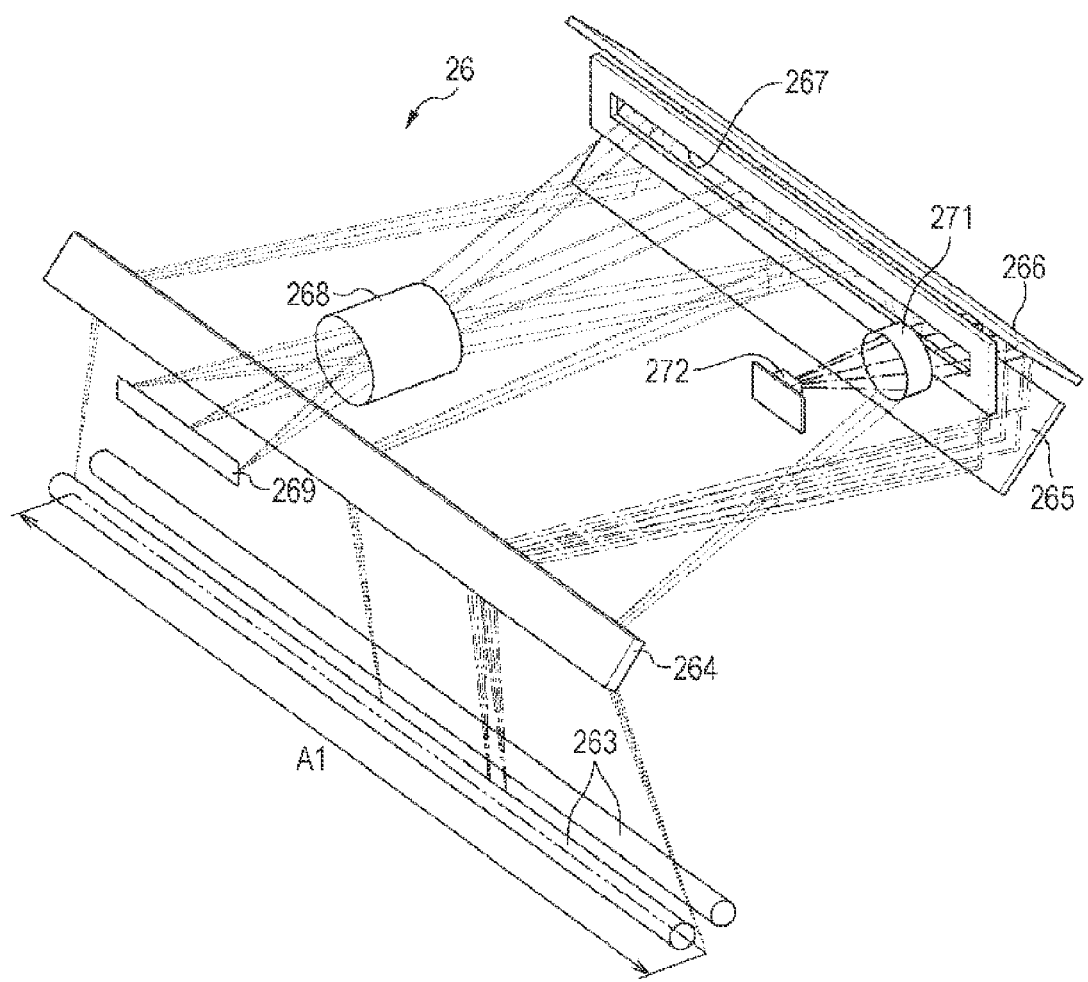
FIG. 4 is a schematic perspective view of the optics in the optical measuring instrument illustrated by the cross-section in FIG. 3.
Figure 5:
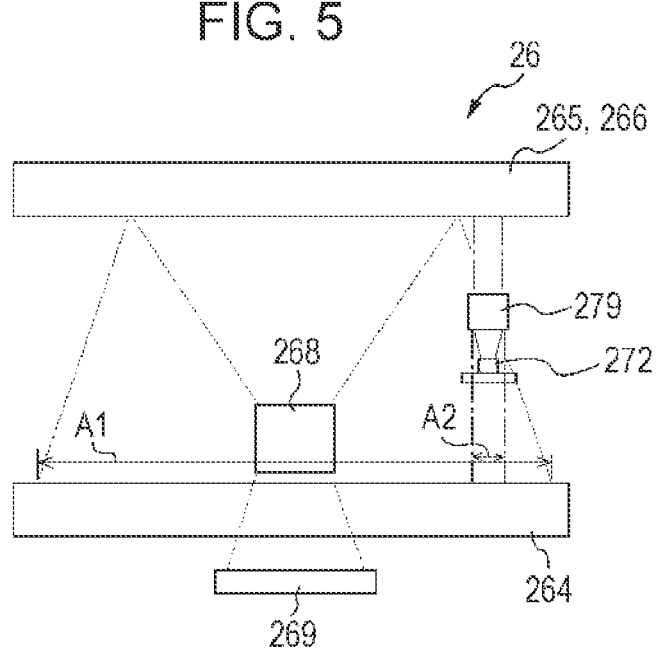
FIG. 5 is a plan view of the optics in an optical measuring instrument as viewed from above.

FIG. 3 is a cross-section view of the optical measuring instrument 26 illustrated in FIG. 1. Also, FIG. 4 is a schematic perspective view of the optics in the optical measuring instrument illustrated by the cross-section in FIG. 3, while FIG. 5 is a plan view of the optics in the optical measuring instrument as viewed from above.

As illustrated in FIG. 3, the optical measuring instrument 26 is equipped with a housing 261 above a sheet path R through which a sheet passes. Immediately above the sheet path R of the housing 261, there is formed an aperture fitted with transparent glass 262. The aperture and the transparent glass 262 fitted into the aperture have an elongated shape in the direction perpendicular to the plane of the page in FIG. 3, with the range of the elongation covering an area greater than the entire width of a sheet passing through the sheet path R. Two lamps 263 are also provided diagonally above the transparent glass 262 in the housing 261. These two lamps 263 are elongated lamps of a length greater than the entire width of a sheet passing through the sheet path R. Light emitted from the two lamps 263 is transmitted through the transparent glass 262 to diagonally irradiate a sheet conveyed along the sheet path R.

Reflected light reflected upwards from a sheet passing through the sheet path R is transmitted through the transparent glass 262, reflected by a mirror 264, additionally reflected by two mirrors 265 and 266, passed through an aperture 267 for screening stray light, and focused by a lens 268 such that an image of the image on the sheet is formed on a line sensor 269. The line sensor 269 is a sensor in which many photosensitive elements are arranged in the direction perpendicular to the plane of the page in FIG. 3. With these many photosensitive elements, the line sensor 269 captures in its visual field the range of the area A1 illustrated in FIGS. 4 and 5, which extends one-dimensionally in the direction perpendicular to the plane of the page. With these many photosensitive elements, an image of one horizontal line's worth of an image on a sheet is read. While a sheet is passing through the sheet path R, repeated readings are taken in the line sensor 269 at 1 ms intervals, for example. In so doing, an image on a sheet is read in 0.1 mm intervals, for example, and image data expressing the entire image is generated. An air cooling fan 270 for the lamps 263 is also provided inside the housing 261. Also, in order to reduce the effects of heat from the lamps 263 on the optical components, the housing 261 is structured such that the chamber provided with the lamps 263 and the fan 270 is partitioned from the chamber provided with the optical components such as the mirrors and lens, with only reflected light from a sheet passing through.

In addition, a polygonal column-shaped reference plate unit 33 is provided below the sheet path R. The reference plate unit 33 is configured such that each face 331 of the polygonal column is a reference plate, such as a white reference plate used as a reference for white color, and color reference plates used as references for various colors, for example. The reference plate unit 33 is rotatable such that each face 331 may face the sheet path R. By having the optical measuring instrument 26 read these reference plates in a state where a sheet is not present on the sheet path R, the reference plate unit 33 is used for brightness correction, shading correction caused by uneven illumination from the lamps 263, and various color corrections.

The optical measuring instrument 26 is also equipped with a lens 271 and a spectroscope 272 illustrated in FIGS. 4 and 5. The lens 271 and the spectroscope 272 are disposed at positions that do not obstruct light beams reflecting off a sheet or reference plate and heading towards the line sensor 269. The spectroscope 272 receives reflected light from a sheet passing over the reference plate unit 33 illustrated in FIG. 3, similarly to the line sensor 269. However, the visual field of the spectroscope 272 is the area A2 illustrated in FIG. 5, which is narrower than the visual field of the line sensor 269 and equivalent to just a portion of a sheet passing through. The area A2 is the area where a patch (discussed later) formed on a sheet passes through when that sheet passes through. The spectroscope 272 is a sensor that spectrally separates reflected light from a patch, and measures the spectral reflectance properties of the patch. The spectroscope 272 is a measuring instrument of lower resolution than the line sensor 269. In other words, using the spectroscope 272 involves some degree of exposure time in order to take accurate spectral measurements, but since a sheet is still being conveyed during the exposure time, spectral measurements are only taken over wide areas in the sheet transport direction. For example, whereas the line sensor 269 reads an image on a sheet in units of 0.1 mm, for example, in the sheet transport direction as described earlier, the spectroscope 272 may read a patch on a sheet in units of 5 mm, for example. In other words, in the example described herein, the line sensor 269 takes 50 readings in the amount of time it takes the spectroscope 272 to take one measurement.

As described above, the optical measuring instrument 26 is used for various purposes, such as taking measurements for color tone correction, taking measurements for correcting the position and magnification of an image on a sheet, taking measurements for detecting image quality defects, and conducting various types of monitoring during ordinary image formation. Hereinafter, a description will be given citing the measurement of the spectral distribution of patches, which is a feature of this exemplary embodiment, as one of these various measurements.

The image forming apparatus 10 includes a color tone correction mode that corrects the color tone of an image formed on a sheet. In the color tone correction mode, multiple patches for correcting color tone in an image are formed in various colors on the basis of image data for color patch images stored in the image processor 30 (see FIG. 1) and arranged on a sheet in the sheet transport direction. The respective patches on the sheet are measured by the optical measuring instrument 26. However, the image data for color patch images is processed so as to correct the color tones of color patches on the basis of color sample data input from outside the image forming apparatus 10 illustrated in FIG. 1.

In the color tone correction mode, color tone-corrected color patches which have been processed in this way are formed. Details will be discussed later with reference to FIGS. 13 and 14.

Figure 6:
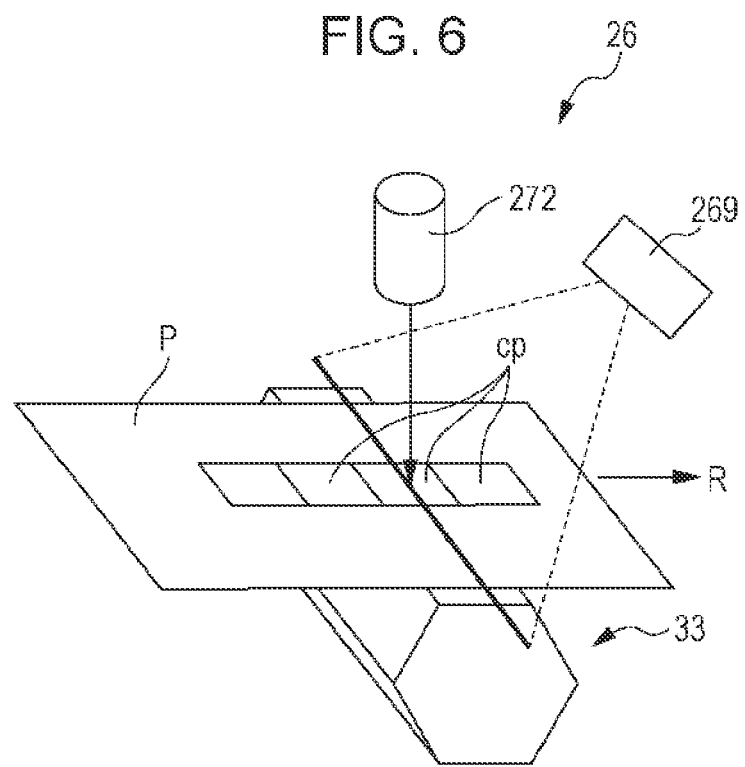
FIG. 6 is a schematic diagram illustrating how a sheet with patches formed thereon passes over a reference plate unit.

FIG. 6 is a schematic diagram illustrating a state where a sheet with patches formed thereon passes over a reference plate unit.

Formed on a sheet of paper P are multiple patches cp (in the examples illustrated herein, four patches cp) arranged in the sheet transport direction indicated by the arrow R. In this exemplary embodiment, the dimension of each of these multiple patches cp in the sheet transport direction is taken to be 20 mm.

When forming patches cp on a sheet of paper P and measuring those patches cp, the reference plate unit 33 is rotated to an orientation in which the white reference plate faces the sheet of paper P. When the sheet of paper P passes over the white reference plate, an image of the patches is read by the line sensor 269. The spectral distribution of each patch cp formed on the sheet of paper P passing over the white reference plate is also measured with the spectroscope 272. As described earlier, the line sensor 269 has a visual field extending over an area that runs out past the sheet of paper P in the width direction of the sheet of paper P, and the area of the white reference plate of the reference plate unit 33 that runs out past the sheet of paper P is also read with the line sensor 269.

Figure 7:
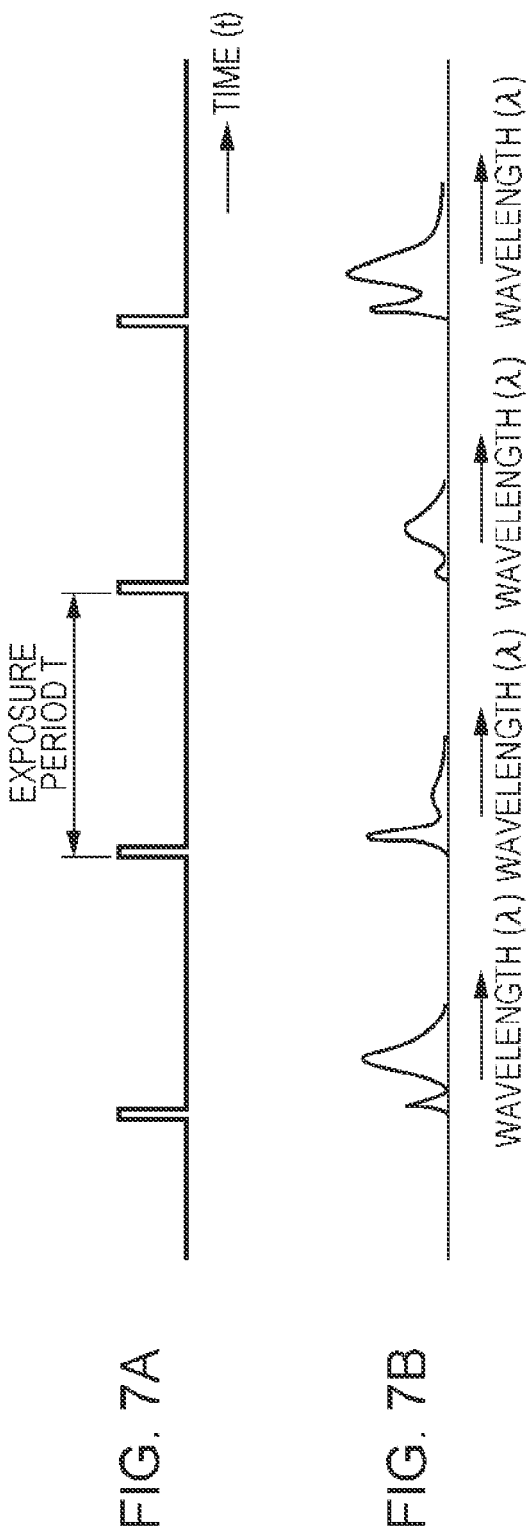
FIGS. 7A and 7B are conceptual diagrams of the exposure period of a spectroscope and spectral data output from the spectroscope.

FIGS. 7A and 7B are conceptual diagrams of the exposure period of a spectroscope and spectral data output from the spectroscope.

A start trigger signal StartTrigger is repeatedly output at a fixed period (herein, a 50 ms period is given as an example) from a synchronization signal generator circuit constituting part of the sensor controller circuit illustrated in FIG. 11 discussed later. When the start trigger signal StartTrigger is input, the spectroscope 272 generates and outputs spectral data on the basis of incident light that is incident within an exposure time T lasting until immediately before the next start trigger signal StartTrigger is input. The spectral data expresses the spectral distribution of the incident light. The spectral data is data in which the horizontal axis represents the wavelength λ and the vertical axis represents the intensity of light for particular wavelengths.

Figure 8:
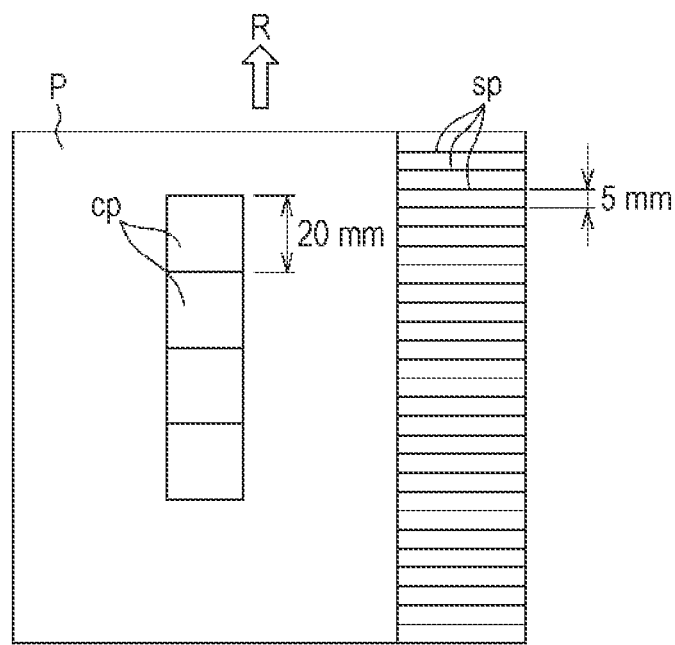
FIG. 8 is a diagram illustrating patches on a sheet lined up next to the spectral data measurement pitch.

FIG. 8 is a diagram illustrating patches on a sheet lined up next to the spectral data measurement pitch.

For the parameters described herein, each patch cp on the sheet of paper P has a dimension of 20 mm in the sheet transport direction. With the line sensor 269, the entire width of a sheet of paper P, including the patches cp on the sheet of paper P, as well as the white reference plate running out past that sheet are read at a 0.1 mm pitch in the sheet transport direction R. Meanwhile, spectral data sp is output from the spectroscope 272 at a 5 mm pitch in the sheet transport direction R when converted into the length of the sheet. In other words, spectral data sp is output four times for a single patch cp.

Figure 9:
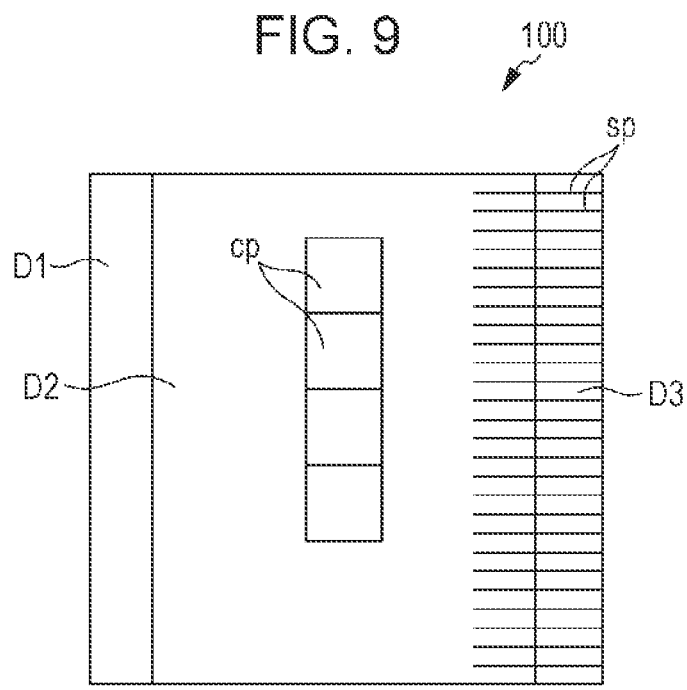
FIG. 9 is a diagram illustrating a memory map of data obtained by measuring patches with an optical measuring instrument.
Figure 10:
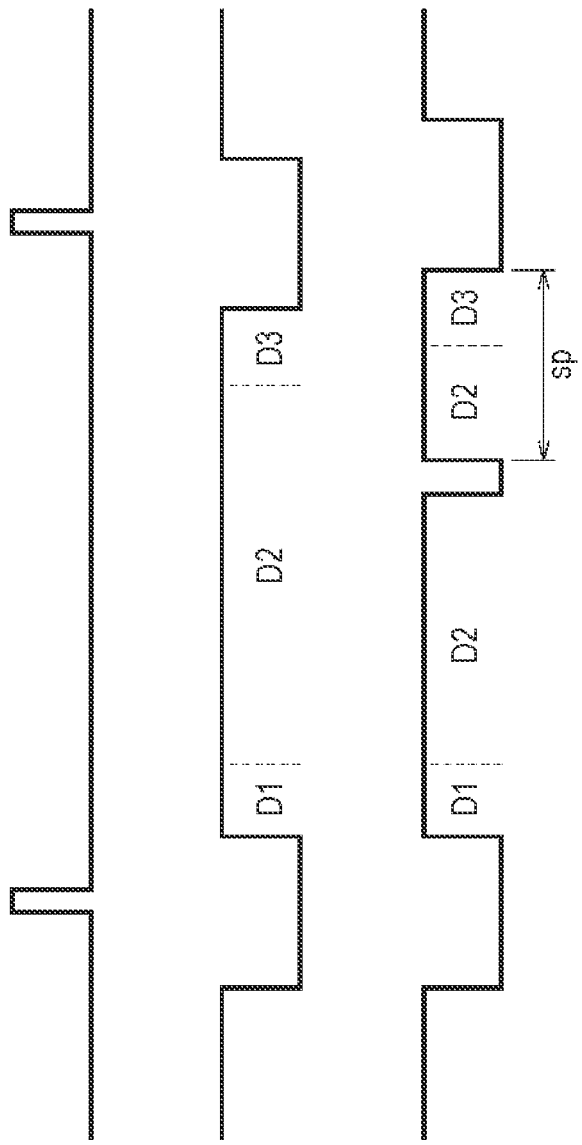
FIGS. 10A to 10C are timing charts for when storing data obtained by patch measurement in memory.

FIG. 9 is a diagram illustrating a memory map of data obtained by measuring patches with an optical measuring instrument. FIGS. 10A to 10C are timing charts for when storing data obtained by patch measurement in memory.

The memory 100 is divided into regions D1 to D3 according to the type of data stored in the memory 100.

Data for one horizontal line in FIG. 9 is written to the memory 100 in synchronization with a line synchronization signal LineSync illustrated in FIG. 10A (see also FIG. 11), and in response to one pulse of the line synchronization signal LineSync. The line synchronization signal LineSync is a signal instructing the line sensor 269 to start reading. The line sensor 269 receives the signal, and generates one line's worth of data.

Herein, before reading a sheet on which patches are formed, white reference data is stored in a storage area separate from the storage area illustrated as the memory 100 in FIG. 9. The white reference data expresses the light intensity distribution of reflected light across the entire white reference plate in the longer direction at a reference time t=0 when a sheet is not present over the white reference plate. Illuminating light from the lamps 263 (see FIG. 3) has a light intensity distribution in the longer direction, and has the property of the light intensity dropping near where its reflected light reaches the line sensor 269, including the optics such as the lens 268, for example, compared to the optical axis center. The photosensitive elements constituting the line sensor 269 also have photosensitivity bias. For this reason, issues such as uneven light intensity and photosensitivity bias are reflected in image data obtained by reading an actual image. Thus, image data is processed on the basis of white reference data read by the line sensor 269 and converted into image data for the case of no uneven light intensity or other issues. In other words, shading correction is conducted. The white reference data is utilized for the purpose of both conducting such shading correction, as well as correcting light intensity variation while subsequently reading an image. The correction of light intensity variation will be discussed later.

As illustrated in FIG. 10B, at timings when spectral data is not being output from the spectroscope 272, white reference data for one of the regions of the white reference plate running out past a sheet, image data obtained by detecting reflected light from a sheet, and white reference data for the other region of the white reference plate running out past a sheet are stored in the areas D1, D2, and D3 of the memory 100, respectively. The respective data is data for the same point in time for a one horizontal line.

At timings when spectral data sp is output from the spectroscope 272, that spectral data sp is stored in the memory 100 instead of part of the image data or white reference data.

Even for lines in the memory 100 where spectral data sp is stored, white reference data and image data is still stored similarly to other lines where spectral data sp is not stored, except for the area where the spectral data sp is stored. In other words, spectral data sp is stored instead of white reference data and image data in only part of the area where spectral data sp is stored. In this case, data from the line sensor 269 is stored in the area D1 and partway through the area D2 of the memory, and after that, the memory is switched to the storage of spectral data from the spectroscope 272, with the spectral data being stored in the remaining part of the area D2 and the area D3, as illustrated in FIG. 10C. Consequently, the spectral data sp is data having the same timings as the white reference data and image data on the same line. Thus, the read timings in the line sensor 269 and the measurement timings in the spectroscope 272 are associated.

Figure 11:
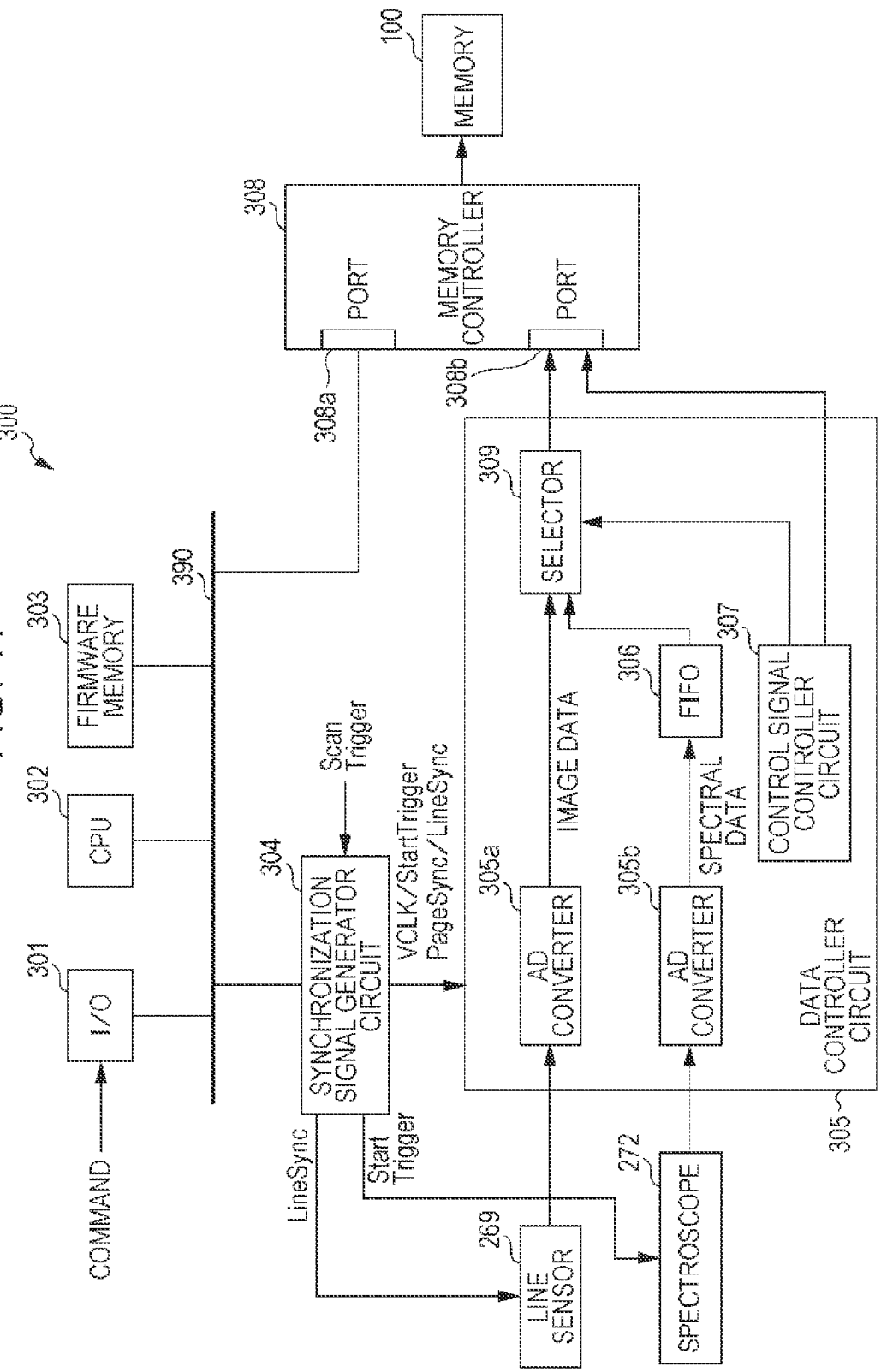
FIG. 11 is a block diagram of a sensor controller circuit.
Figure 12:
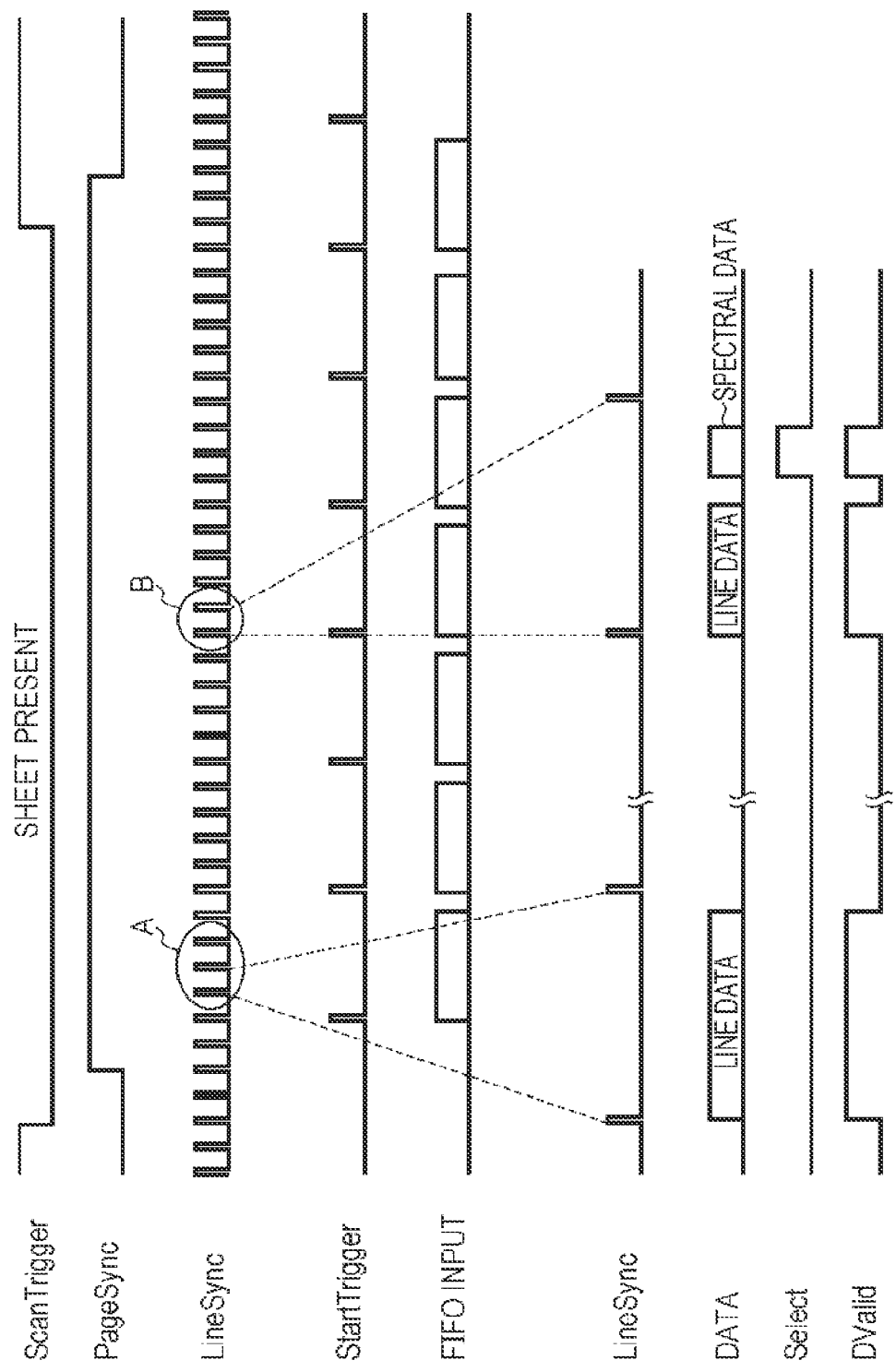
FIG. 12 is a timing chart illustrating the behavior of the sensor controller circuit illustrated in FIG. 11.

FIG. 11 is a block diagram of a sensor controller circuit, while FIG. 12 is a timing chart illustrating the behavior of the sensor controller circuit illustrated in FIG. 11.

The sensor controller circuit 300 illustrated in FIG. 11 is a circuit built into the image processor 30 illustrated in FIG. 1.

The sensor controller circuit 300 illustrated in FIG. 11 is equipped with an I/O 301, a CPU 302, and firmware memory 303, which are connected to a bus 390. Additionally, the sensor controller circuit 300 is equipped with a synchronization signal generator circuit 304, a data controller circuit 305, a memory controller 308, and the memory 100. Among these, the synchronization signal generator circuit 304 is connected to the bus 390. Also, the memory controller 308 has two ports, a first port 308a and a second port 308b, and of these two ports, the first port 308a is connected to the bus 390. Meanwhile, the second port 308b of the memory controller 308 is connected to the data controller circuit 305. The data controller circuit 305 is equipped with two AD converters 305a and 305b, a FIFO 306, a selector 306, and a control signal controller circuit 307.

The I/O 301 manages communication between the sensor controller circuit 300 and external circuits, fulfilling the role of receiving commands from external circuits and sending computational results to external circuits.

The CPU 302 assumes the role of executing programs.

Information such as a program executed by the CPU 302 and data relevant to the execution of that program is stored in the firmware memory 303.

The synchronization signal generator circuit 304 assumes the role of generating various synchronization signals, to be described hereinafter.

When a command to switch to the color tone correction mode is input from an external circuit via the I/O 301, the CPU 302 sends initialization information, such as the number of clocks per line and the number of lines per page, to the synchronization signal generator circuit 304, and initializes the synchronization signal generator circuit 304.

The image forming apparatus illustrated in FIG. 1 detects that a sheet has approached the optical measuring instrument 26, and generates a scan trigger signal ScanTrigger. The synchronization signal generator circuit 304 includes an internal oscillator (not illustrated), receives the scan trigger signal ScanTrigger, and generates various synchronization signals triggered by the scan trigger signal ScanTrigger.

The line synchronization signal LineSync discussed earlier (see also FIGS. 10A to 10C) is one of these synchronization signals. The line synchronization signal LineSync is input into the line sensor 269. The start trigger signal StartTrigger is also generated in the synchronization signal generator circuit 304. The start trigger signal StartTrigger is a signal instructing the spectroscope 272 to start measurement. A start trigger signal StartTrigger generated by the synchronization signal generator circuit 304 is input into the spectroscope 272. At this point, the start trigger signal StartTrigger is a signal that matches the timings of the line synchronization signal LineSync, and in the example described herein, is synchronously output once for every 50 times the line synchronization signal LineSync is output.

Additionally, a page synchronization signal PageSync and a video clock signal VCLK are generated in the synchronization signal generator circuit 304. The page synchronization signal PageSync is a synchronization signal expressing the start and completion of the acquisition of one entire image, while the video clock signal VCLK is a signal synchronized to the pixels. The page synchronization signal PageSync and the video clock signal VCLK are input into the data controller circuit 305. Additionally, the above line synchronization signal LineSync and the start trigger signal StartTrigger are also input into the data controller circuit 305.

In the line sensor 269, an image signal synchronized to the line synchronization signal LineSync is generated, and the generated image signal is input into the first AD converter 305a in the data controller circuit 305. In the first AD converter 305a, the input image signal is converted into image data, being a collection of pixel data synchronized to the video clock signal VCLK.

Also, in the spectroscope 272, a signal expressing the spectral distribution is generated in synchronization with the start trigger signal StartTrigger, and that signal is input into the second AD converter 305b. The second AD converter 305b converts the input signal into digital spectral data synchronized to the video clock signal VCLK, and outputs the result. Although the spectral data is synchronized to the video clock signal VCLK, the time axis expressed by the video clock signal VCLK corresponds to the wavelength of the light. The spectral data output from the second AD converter 305b is input into the FIFO 306 and temporarily buffered. The FIFO 306 is a type of memory that outputs data input thereinto in the input order.

The first AD converter 305a and the FIFO 306 are connected to the selector 306. The selector 306 conducts switching behavior according to a select signal Select generated by the control signal controller circuit 307.

The control signal controller circuit 307 generates the select signal Select a data validation signal DValid, and respectively controls the selector 306 and the memory controller 308.

As illustrated in FIG. 12, the select signal Select is a signal that switches the selector 306 so as to allow the passage of data from the first AD converter 305a when at the low (L) level, and allow the passage of spectral data from the FIFO 306 when at the high (H) level. The control signal controller circuit 307 sets the select signal Select to the L level at timings when the line synchronization signal LineSync is present but the start trigger signal StartTrigger is not present, as illustrated by the portion A of FIG. 12. Conversely, the control signal controller circuit 307 varies the select signal Select to the H level at timings during the synchronization with the video clock signal VCLK while the line synchronization signal LineSync and the start trigger signal StartTrigger are both present, as illustrated by the portion B of FIG. 12.

The control signal controller circuit 307 also transmits the data validation signal DValid to the second port 308b of the memory controller 308. The data validation signal DValid is a signal indicating that valid data is being issued to the second port 308b, and goes to H level while valid data is being issued to the second port 308b. The H level period differs between the portion A and the portion B, as illustrated in FIG. 12. While the data validation signal DValid is at the H level, the memory controller 308 acquires and stores data from the second port 308b in the memory 100. As illustrated in FIG. 12, the above behavior continues while the page synchronization signal PageSync is at the H level, and as a result, the data described with reference to FIG. 9 is stored in the memory 100.

Note that although the above describes data storage behavior while a sheet passes through, the white reference plate is read similarly to the portion A illustrated in FIG. 12 at a time t=0 when a sheet is not present, and is stored in a storage area separate from the storage area indicated as the memory 100 in FIG. 9.

Data stored in the memory 100 in this way is retrieved from the memory 100 in response to the CPU 302 accessing the first port 308a of the memory controller 308. By having the CPU 302 execute a program stored in the firmware memory 303, data is retrieved from the memory 100 and subjected to the processing described with reference to FIG. 14.

Figure 13:
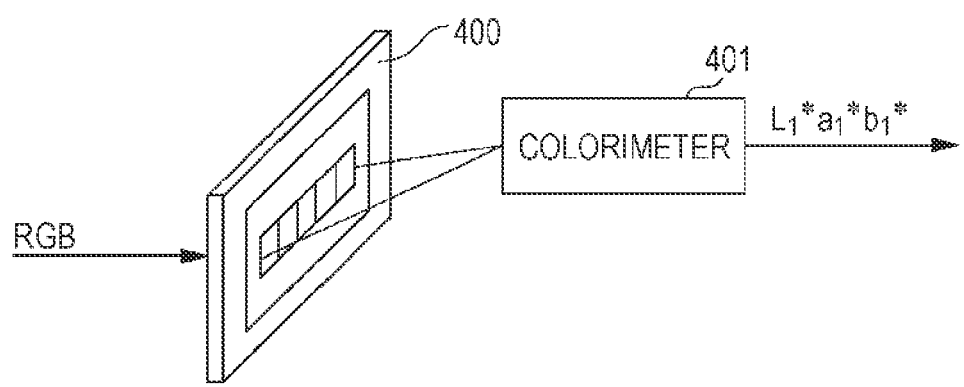
FIG. 13 is a schematic diagram illustrating the relationship between RGB data and L*a*b* data.

FIG. 13 is a schematic diagram illustrating the relationship between RGB data and L*a*b* data.

Figure 14:
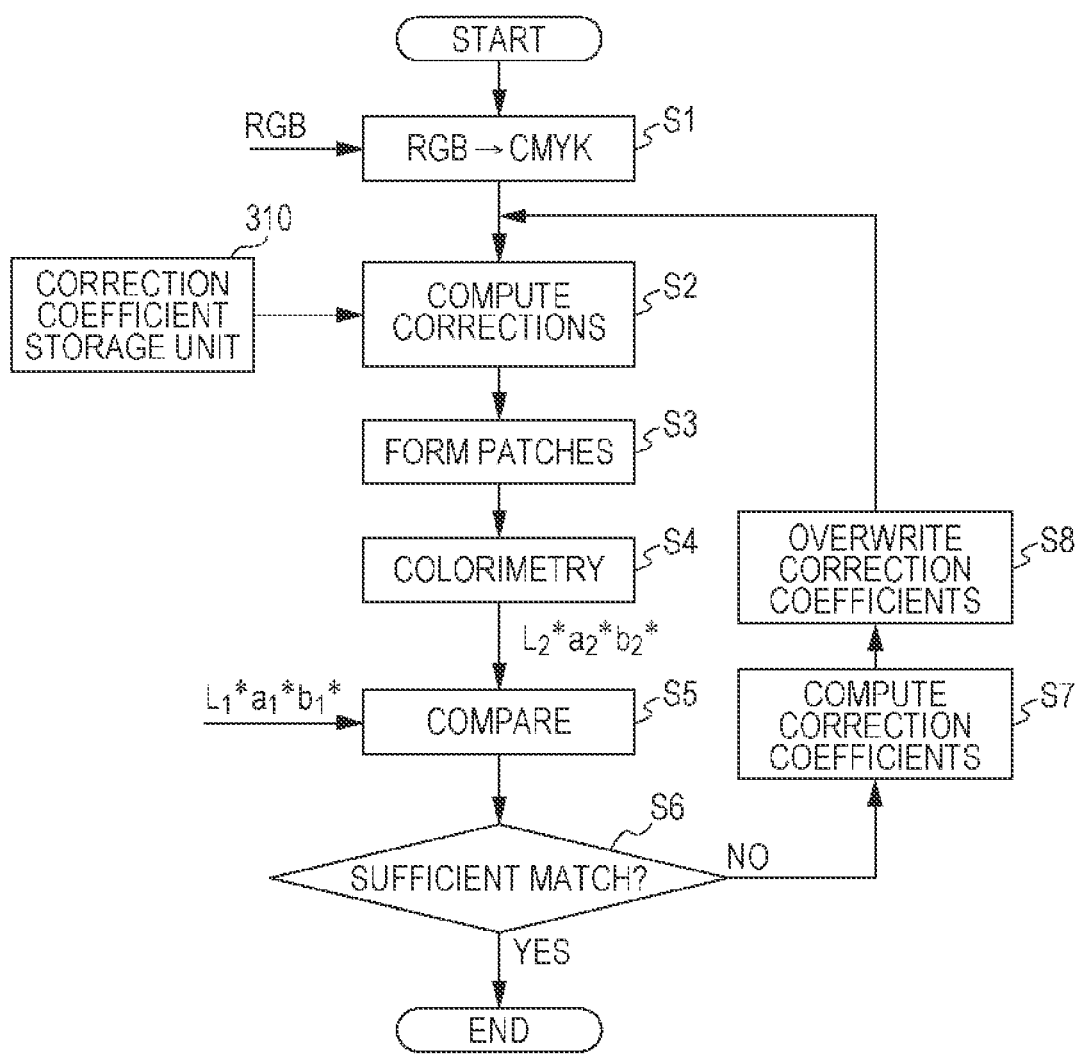
FIG. 14 is a diagram illustrating the flow of a series of operations in a color tone correction mode.

FIG. 14 is a diagram illustrating the flow of a series of operations in a color tone correction mode, including operations such as the spectral data generation discussed earlier.

In order for the image forming apparatus 10 to operate in the color tone correction mode, color sample data is created in advance by a color sample creator, directly or indirectly with respect to the image forming apparatus 10.

Creating such color sample data involves the color sample creator inputting image data expressed as RGB data into a monitor 400, displaying various reference colors such as color patches on the monitor 400, and adjusting the RGB data such that the reference colors express color tones that are satisfactory for the color sample creator. If reference colors with satisfactory color tones are displayed on the monitor 400, colorimetric measurements of the reference colors are taken by a colorimeter 401, L*a*b* data of the reference colors is generated, and the RGB data input into the monitor 400 is associated with the L*a*b* data obtained by the colorimeter 401. Herein, the L*a*b* data associated with the reference color RGB data is designated $L_1*a_1*b_1*$ data. The associated RGB data and L*a*b* data is input into the image processor 30 of the image forming apparatus 10 illustrated in FIG. 1.

When execution of the color tone correction mode is initiated in the image forming apparatus 10, RGB data that has been created as above and input is first converted into CMYK data, as illustrated in step S1 of FIG. 14. The image processor 30 of the image forming apparatus 10 in FIG. 1 is provided with a correction coefficient storage unit 310. The correction coefficient storage unit 310 stores correction coefficients used to correct CMYK data. However, the correction coefficient storage unit 310 is empty in its initial state.

In step S2 of FIG. 14, correction computations are performed on the CMYK data computed in step S1 according to the correction coefficients stored in the correction coefficient storage unit 310. Subsequently, color patches cp (see FIG. 8) for color tones based on the CMYK data corrected by the correction computations are formed on a sheet of paper P (step S3), and the optical measuring instrument 26 (see FIG. 1) is used to take colorimetric measurements of the color patches cp (step S4). Details of such colorimetry will be discussed later.

With colorimetry, L*a*b* data expressing the color tones of the color patches cp formed on the sheet is generated. Herein, the L*a*b* data expressing the color tones of these color patches cp is designated $L_2*a_2*b_2*$ data.

The $L_2*a_2*b_2*$ data obtained by colorimetry and expressing the color tones of the color patches cp is compared against the reference color $L_1*a_1*b_1*$ obtained by the colorimeter 401 illustrated in FIG. 3 (step S5), and it is determined whether or not $L_2*a_2*b_2*$ is within a predetermined distance from $L_1*a_1*b_1*$, or in other words, whether or not the two sets of data sufficiently match (step S6). When the two sets of data do sufficiently match, the color tone correction mode ends. Conversely, when the degree of matching is still insufficient, CMYK correction coefficients for bringing $L_2*a_2*b_2*$ closer to $L_1*a_1*b_1*$ are computed (step S7), and the correction coefficients stored in the correction coefficient storage unit 310 are overwritten with the newly computed correction coefficients (step S8). After that, the process returns to step S2, the CMYK data obtained in step S1 is corrected by the new correction coefficients stored in the correction coefficient storage unit 310, and the process is repeated with steps similar to the above until $L_2*a_2*b_2*$ sufficiently matches $L_1*a_1*b_1*$.

The correction coefficients created in this way and stored in the correction coefficient storage unit 310 are also applied when correcting image data expressed by RGB data subsequently input into image forming apparatus 10. In so doing, an image with the intended color tones is formed. In this exemplary embodiment, the correction coefficients correspond to an example of color tone correction data, while the correction coefficient storage unit 310 corresponds to an example of a storage unit. Also, the CPU 302 conducting computations for creating correction coefficients in the flow illustrated in FIG. 15 corresponds to an example of a computational unit.

Note that the image forming apparatus 10 illustrated in FIG. 1 is an image forming apparatus able to use special colors V and W besides CMYK. Unlike the process colors CMYK, the special colors are often used singly as the color of the special color itself, and in this exemplary embodiment, are exempted from the computation of correction coefficients in FIG. 15.

Next, the colorimetry step (step S4) will be described in detail.

Figure 15:
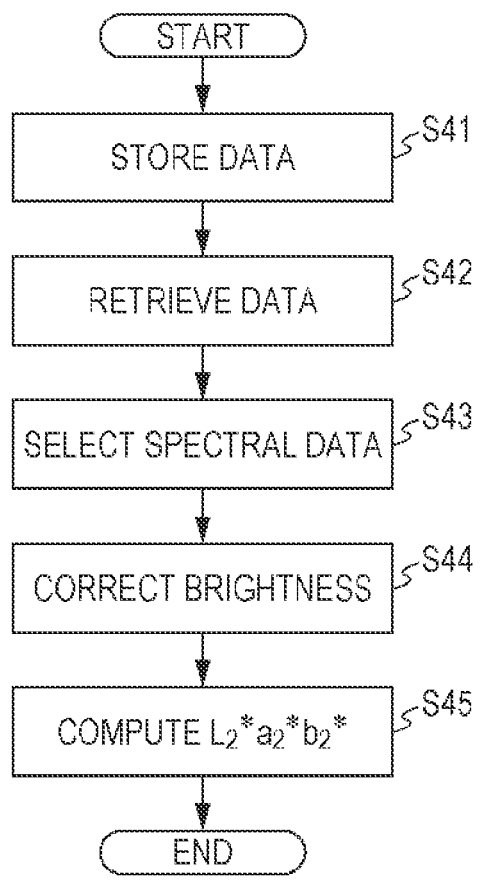
FIG. 15 is a diagram illustrating a detailed flow of a colorimetry step.

FIG. 15 is a diagram illustrating a detailed flow of the colorimetry step.

First, data is stored in the memory 100 (see FIGS. 9 and 11) as discussed earlier (step S41). Next, the stored data is retrieved (step S42).

As discussed earlier, in the example illustrated herein, the length of a single color patch cp in the sheet transport direction is 20 mm, while spectral data is generated at 5 mm intervals in terms of the length of the sheet. In other words, four sets of spectral data are generated for a single, 20 mm color patch. At this point, there exists an error factor regarding the colorimetry of a color patch cp, in which stray light reflecting off an adjacent color patch cp is incident on a color patch being spectrally measured, and the reflected light from the color patch cp being spectrally measured blends in and enters the spectroscope 272. This error factor is expressed more strongly near adjacent color patches cp and closer to the edges in the sheet transport direction. Since the information obtained by the spectroscope 272 represents the average spectral characteristics across 5 mm of a color patch cp in terms of its length in the sheet transport direction, data at the edges of a color patch cp in the sheet transport direction may be discarded, and data from the central portion may be adopted as the data for a color patch cp.

In order to realize the above, spectral data for each color patch cp is selected on the basis of RGB data obtained by the line sensor 269 (step S43 of FIG. 15).

Figure 16A:
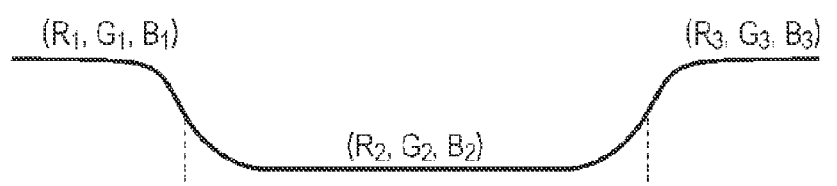
FIGS. 16A and 16B are diagrams explaining a spectral data selection method.
Figure 16B:
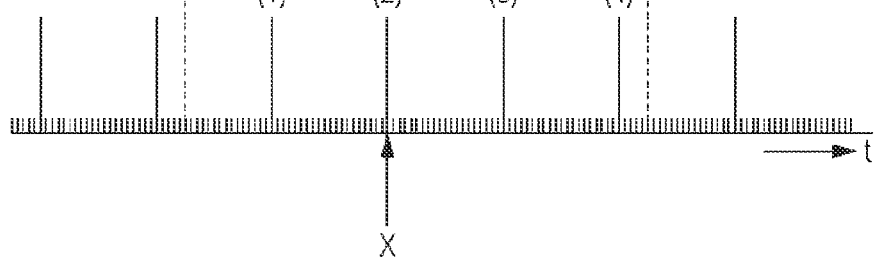

FIGS. 16A and 16B are diagrams explaining a spectral data selection method.

FIG. 16A illustrates RGB data for a color patch cp obtained by the line sensor 269, while FIG. 16B represents the timings when the spectroscope 272 obtains spectral data.

As illustrated in FIG. 16A, the RGB change points corresponding to the boundaries of a color patch cp are detected on the basis of image data retrieved from the memory 100, and the four sets of spectral data between these change points are recognized as being the spectral data for that color patch cp. Among the four sets of spectral data recognized in this way, the spectral data measured for the 5 mm closest to the central portion of the color patch cp in the sheet transport direction is selected. In the example illustrated herein, the spectral data (3) obtained by measuring the period from (2) to (3) closest to the central portion from among the four sets of spectral data (1) to (4) for a given color patch cp is selected as the spectral data for that color patch cp.

After selecting spectral data (step S43 of FIG. 15), the brightness of the spectral data is corrected next (step S44).

Figure 17A:
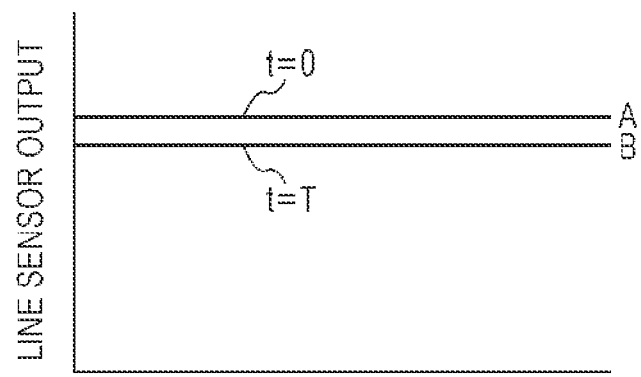
FIGS. 17A and 17B are diagrams explaining brightness correction for spectral data.
Figure 17B:
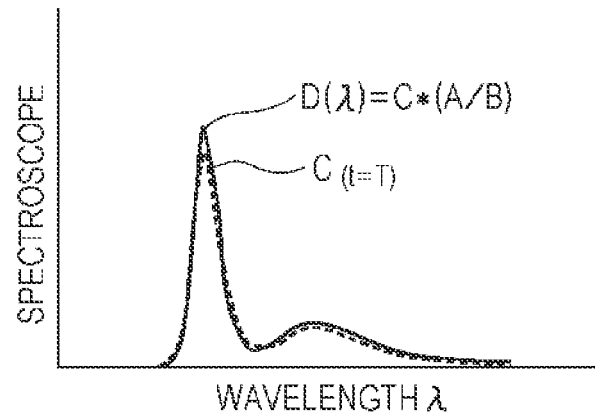

FIGS. 17A and 17B are diagrams explaining brightness correction for spectral data.

FIG. 17A illustrates brightness variation for a white reference plate as read by a line sensor. The label t=0 represents the output from the line sensor when reading the white reference plate at a reference time t=0 when a sheet is not present. The label t=T is the output from the line sensor 269 at the same time as the time T as obtaining spectral data selected as above.

FIG. 17B illustrates t=T spectral data selected as above, and spectral data obtained by correcting the t=T spectral data.

Herein, if A and B are taken to be the respective values for the white reference plate at t=0 and t=T, and C(λ) is taken to be the spectral data at t=T, C(λ) is corrected according to $$D(\lambda)=C*(A/B) \quad (1)$$

to obtain D(λ). In other words, the spectral data is corrected so as to match the illumination conditions at t=0. The same reference time is adopted as the reference time t=0 until the process in FIG. 14 ends. In other words, while performing the series of processing operations in FIG. 14, comparisons are made using $L_2*a_2*b_2*$ corrected under the same illumination conditions, even in cases where colorimetry (step S4 of FIG. 14) is repeated multiple times.

In step S45 of FIG. 15, $L_2*a_2*b_2*$ is computed on the basis of spectral data that has been corrected for brightness as above.

Computing $L_2*a_2*b_2*$ on the basis of RGB data obtained by the line sensor 269 produces large error. However, in the case of this exemplary embodiment, a spectroscope 272 is implemented to compute $L_2*a_2*b_2*$, and thus a high-precision $L_2*a_2*b_2*$ is computed. Also, illumination intensity variation in the lamps 263 (see FIG. 3) produces equivalent error with just the spectroscope 272. However, in this exemplary embodiment, spectral data is stored to match the timings of data from the line sensor 269, and the brightness of the spectral data is corrected on the basis of the data from the line sensor 269, thus resulting in a system that is resilient to illumination intensity variation. Furthermore, in this exemplary embodiment, spectral data obtained by colorimetry taken closest to the central portion of a color patch cp is selected from among multiple sets of spectral data corresponding a single color patch cp, thereby enabling colorimetry at higher precision in this exemplary embodiment.

Next, a second exemplary embodiment will be described. Herein, only the points that differ from first exemplary embodiment described in the foregoing will be described.

Figure 18:
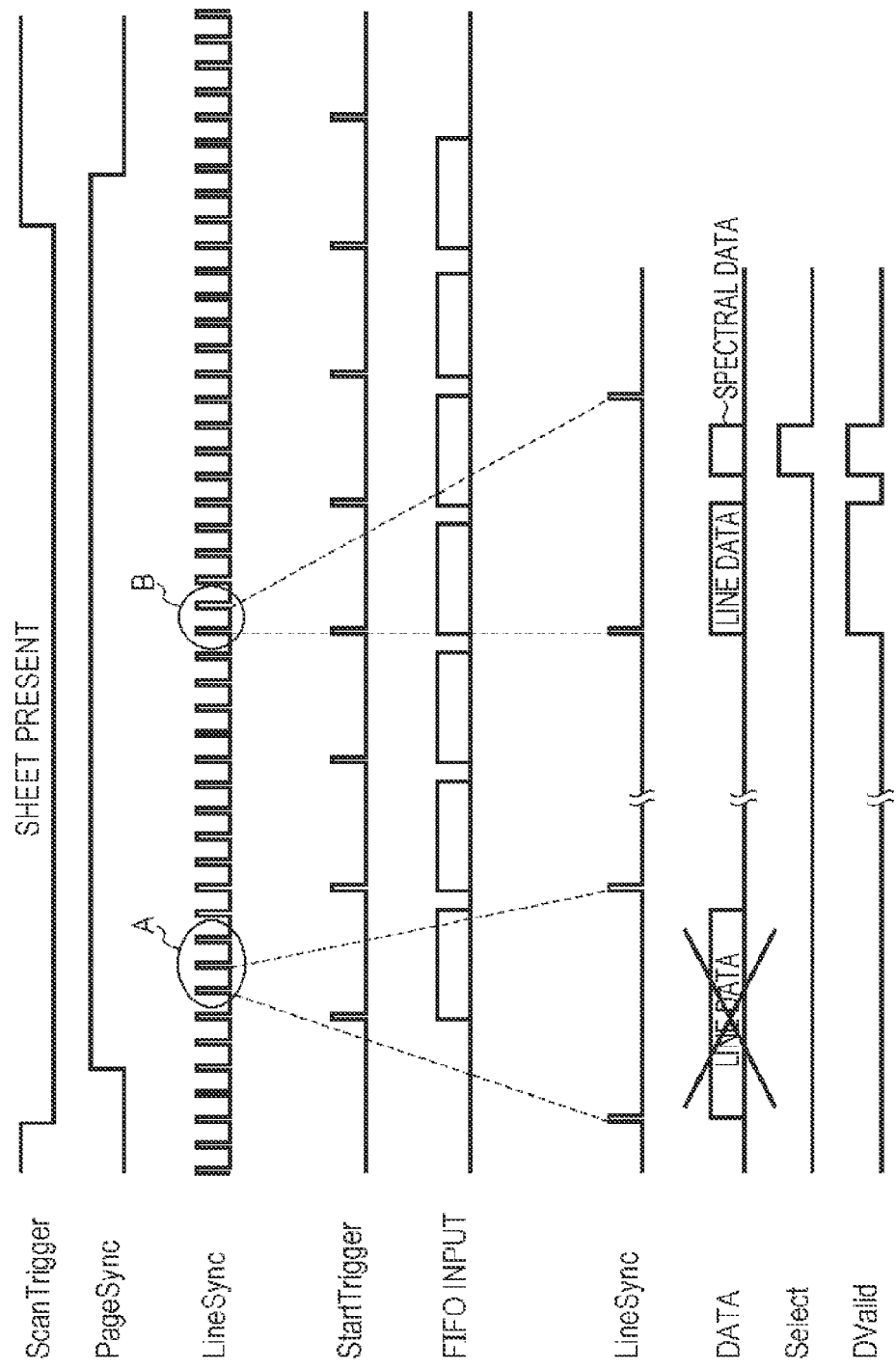
FIG. 18 is a timing chart substituting for FIG. 12 according to a second exemplary embodiment.

FIG. 18 is a timing chart substituting for FIG. 12 according to the second exemplary embodiment.

In the timing chart illustrated in FIG. 18, the data validation signal DValid stays at the L level in the portion A. In other words, output from the line sensor 269 is not stored in the memory 100 (see FIG. 11) at timings when there is not output from the spectroscope 272. In contrast, in the portion B, the data validation signal DValid goes to the H level, and both data originating from the line sensor 269 and data originating from the spectroscope 272 is stored in the memory 100.

Figure 19:
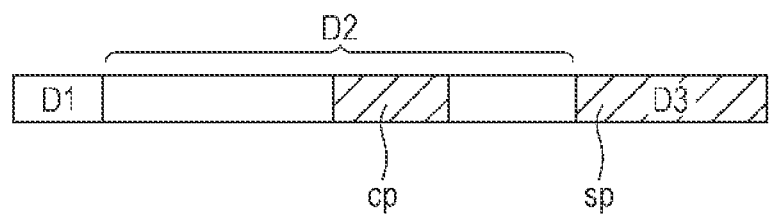
FIG. 19 is a diagram illustrating a memory map according to a second exemplary embodiment.

FIG. 19 is a diagram illustrating a memory map according to the second exemplary embodiment. FIG. 19 illustrates a memory map for one line's worth of the areas D1, D2, and D3 illustrated in FIG. 9.

In this case, data originating from the line sensor 269 is stored in the area D1 and partway through the area D2, while spectral data is stored in the remaining portion of the area D2 and in the area D3.

As the description of the first exemplary embodiment demonstrates, for brightness correction of spectral data (see FIG. 17), it is sufficient for data from the line sensor 269 to exist at the same timings as the spectral data. Thus, in the second exemplary embodiment, it is configured such that data originating from the line sensor 269 at timings when spectral data does not exist is not stored in the memory 100, thereby potentially saving storage space in the memory 100.

However, in this case, spectral data is not selected on the basis of data originating from the line sensor 269 as described with reference to FIGS. 16A and 16B. Rather, in the second exemplary embodiment, the precision in detecting that a sheet has approached the optical measuring instrument 26 is raised, and spectral data is selected on the basis of the scan trigger signal ScanTrigger indicating that a sheet has been detected. In addition, the spectral data to select is uniformly fixed at the spectral data (2) from among the spectral data (1) to (4) illustrated in FIG. 16B, for example.

Note that although the foregoing describes a type of image forming apparatus that forms an image using toner for six colors, the foregoing is also applicable to existing types of image forming apparatus that form an image with toner for the four colors CMYK.

In addition, an embodiment of the present invention is also applicable to an image reading apparatus that is not providing with functionality for forming an image, and instead receives a sheet with an image formed thereon by another image forming apparatus, and reads the image formed on that sheet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image reading unit that reads, from a sheet being transported, an image printed onto the sheet, the image reading unit including
      a reference reflecting member that acts as a color reference, having at least a part thereof disposed at a location in proximity to the sheet being transported in the sheet width direction that intersects the sheet transport direction,
      an illuminating unit that illuminates the reference reflecting member and the sheet passing through,
      a line sensor that reads, from the sheet being transported, the image formed on the sheet, and in addition, reads the part of the reference reflecting member in proximity to the sheet in the sheet width direction, and
      a spectroscope which has a visual field encompassing a plurality of patches for correcting color tones formed on the sheet and arranged in the sheet transport direction, and which measures spectral distribution of each patch; and
   a computational unit that generates color tone correction data for correcting color tones by performing computations based on the spectral distribution of each patch measured by the spectroscope, and the read values of the reference reflecting member obtained by the line sensor,
   wherein the computational unit stores, in memory, reading results from the line sensor and measurement results from the spectroscope at timings that match each other, extracts the measurement results expressing the spectral distributions of the patches as measured by the spectroscope on the basis of the reading results from the line sensor at the matched timings, and uses the extracted spectral distributions to generate the color tone correction data.

2. An image forming apparatus comprising:
   an image forming unit that forms an image on a sheet being transported, the image forming unit including
      a color correction mode that forms a plurality of patches for correcting color tones in an image onto the sheet and arranged in the sheet transport direction;

an image reading unit disposed downstream from the image forming unit in the sheet transport direction that reads, from the sheet being transported, the image printed onto the sheet, the image reading unit including
    a reference reflecting member that acts as a color reference, having at least a part thereof disposed in the sheet width direction that intersects the sheet transport direction at a location in proximity to the sheet being transported,
    an illuminating unit that illuminates the reference reflecting member and the sheet passing through,
    a line sensor that reads, from the sheet being transported, the image formed on the sheet, and in addition, reads the part of the reference reflecting member in proximity to the sheet in the sheet width direction, and
    a spectroscope which has a visual field encompassing the plurality of patches formed on the sheet, and which measures spectral distribution of each patch in the color tone correction mode;
a computational unit that generates color tone correction data for correcting color tones in the image by performing computations based on the spectral distribution of each patch measured by the spectroscope, and the read values of the reference reflecting member obtained by the line sensor, wherein the computational unit stores, in memory, reading results from the line sensor and measurement results from the spectroscope at timings that match each other, extracts the measurement results expressing the spectral distributions of the patches as measured by the spectroscope on the basis of the reading results from the line sensor at the matched timings, and uses the extracted spectral distributions to generate the color tone correction data; and
a storage unit that stores the color tone correction data generated by the computational unit;
wherein the image forming unit corrects image data on the basis of the color tone correction data stored in the storage unit, and forms an image onto a sheet based on the corrected image data.

3. An image reading method comprising:

illuminating a reference reflecting member that acts as a color reference, having at least a part thereof disposed at a location in proximity to a sheet being transported in the sheet width direction that intersects the sheet transport direction, and also illuminating the sheet passing through;

reading, from the sheet being transported, an image formed on the sheet, and in addition, reading the part of the reference reflecting member in proximity to the sheet in the sheet width direction to generate reading results;

measuring spectral distribution of each of a plurality of patches for correcting color tones formed on the sheet and arranged in the sheet transport direction to generate measurement results;

storing, in memory, the reading results from the reading and the measurement results from the measuring at timings that match each other; and generating color tone correction data for correcting color tones by performing computations based on the measured spectral distribution of each patch, and the read values of the reference reflecting member, wherein the generating comprises extracting the stored measurement results expressing the spectral distributions of the patches on the basis of the stored reading results at the matched timings, and using the extracted spectral distributions to generate the color tone correction data.

* * * * *